(12) United States Patent
Abe

(10) Patent No.: US 7,394,746 B2
(45) Date of Patent: Jul. 1, 2008

(54) OPTICAL HEAD APPARATUS AND OPTICAL INFORMATION PROCESSING APPARATUS

(75) Inventor: Tsuguhiro Abe, Chiba (JP)

(73) Assignee: Sony Corporation, Tokyo (JP)

(*) Notice: Subject to any disclaimer, the term of this patent is extended or adjusted under 35 U.S.C. 154(b) by 708 days.

(21) Appl. No.: 10/896,959

(22) Filed: Jul. 23, 2004

(65) Prior Publication Data
US 2005/0047314 A1    Mar. 3, 2005

(30) Foreign Application Priority Data
Aug. 11, 2003   (JP)   ............... 2003-291310

(51) Int. Cl.
*G11B 7/00* (2006.01)
(52) U.S. Cl. .............. 369/112.05; 369/112.1
(58) Field of Classification Search ................
369/112.03–112.15
See application file for complete search history.

(56) References Cited

U.S. PATENT DOCUMENTS

| | | | | |
|---|---|---|---|---|
| 4,940,890 A | * | 7/1990 | Opheij et al. | ............... 250/216 |
| 5,465,247 A | * | 11/1995 | Kobayashi | ............. 369/112.28 |
| 5,608,695 A | * | 3/1997 | Yamazaki | ................ 369/44.12 |
| 6,014,360 A | * | 1/2000 | Yonekubo et al. | ...... 369/112.16 |
| 6,938,890 B2 | * | 9/2005 | Yoo et al. | ............. 369/112.26 |
| 7,200,098 B2 | * | 4/2007 | Yoo et al. | ............. 369/112.23 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

To reduce the optical path length of the entire optical system in a reproduction or recording optical system of an optical recording medium, and promote miniaturization and reductions in costs of apparatuses. An optical head apparatus has an optical system an including a light source and a translucent optical element and irradiates light exiting from the light source, after having been transmitted through the optical element, onto the optical recoding medium. The optical element has a surface or surfaces having negative power on the light-source side and a surface or surfaces having positive power on the optical-recording-medium side. In order to increase the power of the surface or surfaces, one or more of these surfaces are formed as a hologram surface on which a concentric hologram pattern is formed.

10 Claims, 3 Drawing Sheets

F I G. 5
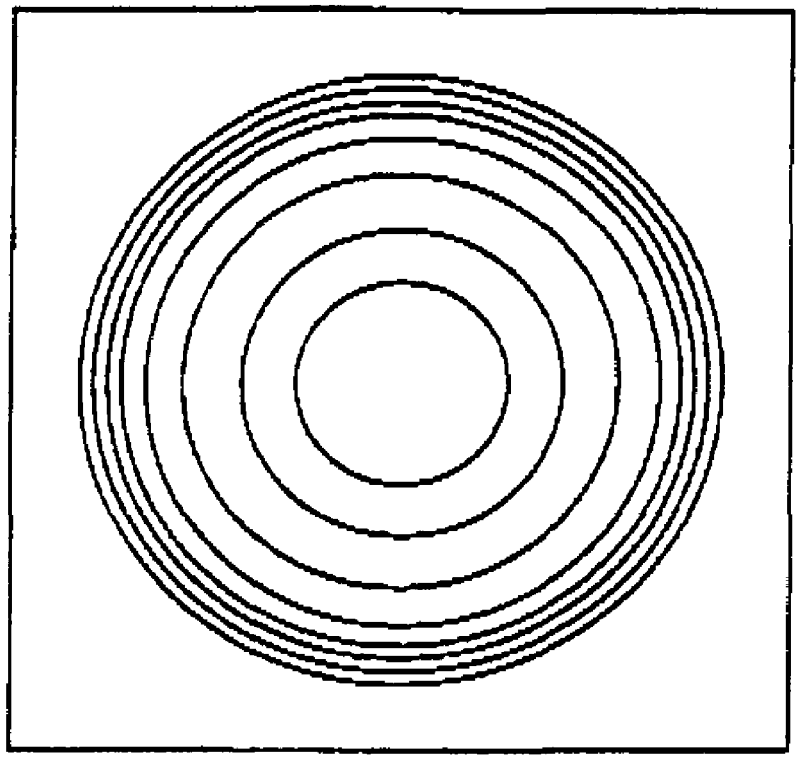

OPTICAL HEAD APPARATUS AND OPTICAL INFORMATION PROCESSING APPARATUS

CROSS REFERENCE TO RELATED APPLICATION

The present document is based on Japanese Priority Document JP2003-291310, filed in the Japanese Patent Office on Aug. 11, 2003, the entire contents of which being incorporated herein by reference.

BACKGROUND OF THE INVENTION

1. Technical Field

The present invention relates to a technique for reducing an optical path length in an optical system for performing reading or recording of information by making use of light irradiation onto an optical recording medium.

2. Description of Related Art

An optical head apparatus (such as an optical pickup apparatus) to be used for the reproduction and recording of information associated with an optical disk is provided with, for example, a light source such as a laser diode, lens elements (such as a collimator lens and a coupling lens) which convert light scattered from the light source into an approximately parallel light beam, and an objective lens which condenses the light beam onto a disk recording surface to its diffraction limit. Light irradiated on to the disk from the objective lens and modulated by the disk is converted to an electrical signal in a light-receiving part using a photodiode, whereby reading of information is performed. For example, as an optical integrated construction, a form in which a laser emission part and a light-receiving part are integrally formed is enumerated (refer to, for example, Patent Document 1: Japanese Patent Application Publication No. Hei10-222859.)

In a pickup apparatus having an optical system in which this integrated element and lens elements are combined and arranged so that the necessary mutual distance is maintained between the elements, a mirror for changing an optical path is disposed on an optical path for the purpose of reducing the entire thickness. In this case, the pickup apparatus needs to have a certain extent of size (an area as viewed from the optical-axis direction of irradiation onto the disk), and the addition of the mirror increases the number of optical component parts and causes a cost increase.

If the apparatus size is to be made small and the number of component parts is to be reduced, it is preferable to avoid as much as possible the use of an optical-path-changing element. Namely, as a form of optical arrangement, it is desirable that light exiting from a laser emission point to be irradiated onto a disk after having traveled rectilinearly without undergoing much optical-path change and been transmitted through lens elements and an objective lens, and that return light from the disk also travels rectilinearly and reaches a light-receiving part.

SUMMARY OF THE INVENTION

To realize the above-mentioned optical system, it is necessary to make the optical path length as short as possible, and this leads to the difficulty that in any conventional form of construction, sufficient characteristics and accuracy are difficult to obtain.

For example, in focus servo control for an objective lens, a focus error signal needs to be formed on the basis of a received-light signal as a control signal for holding the space between the objective lens and a disk in the best state, and an optical magnification more than predetermined power (for example, at least 3 times) is necessary if stable servo signals are to be obtained in various detection methods (such as an astigmatic detection method, a differential concentric circle detection method, and a Foucault detection method). In addition, for the purpose of avoiding collision, interference or the like between the disk and the objective lens, the working distance of the objective lens needs to be made an appropriate value (for example, approximately 1 mm or more in the case of a compact disc) to take into account the vertical run-out of the disk, the position (height) accuracy of a spindle motor, and the like.

To realize an optical system which meets these design requirement and has as short an optical path length as possible and a high optical magnification, an optical element having large negative power needs to be disposed at a location as close to a laser source as possible, and on the side of a disk, an optical element having large positive power as a whole needs to be disposed at a location as close to the disk as possible. However, to ensure a sufficient working distance, it is necessary to secure at least a certain extent of distance between the disk and an objective lens so that the disk and the objective lens are prevented from being excessively close to each other. As a result, far greater positive power is required for the optical element, so that the necessary effective diameter necessarily becomes large.

If large power is to be obtained in each of the optical elements having positive power and negative power, the curvatures of their constituent surfaces need to be made large, i.e., surfaces having smaller radii of curvature become necessary, so that the lenses become thick and cannot be accommodated within the necessary optical path length or problems will occur in lens fabrication (difficulty in manufacturing molds, degradation of transfer of molding shapes, and the like). In addition, as a problem associated with optical design, there may be, for example, the disadvantage that although a radius of curvature which is approximately not greater than an effective radius is necessary, a solution for a lens cannot be found.

Therefore, the present invention intends to reduce the optical path length of the entire optical system in a reproduction or recording optical system of an optical recording medium, and promote miniaturization and reductions in costs of apparatuses.

The present invention provides an optical head apparatus including a translucent optical element which constitutes an optical system together with a light source has a surface or surfaces having negative power on a light-source side, and a surface or surfaces having positive power on an optical-recording-medium side, and at least one of these surfaces is formed as a hologram surface in order to increase the power of the surface or surfaces, and a concentric hologram pattern centered at the intersection of that surface and the optical axis of the optical system is formed.

In the present invention, since use is made of the diffraction action of the hologram surface, larger power can be obtained, and the surface or surfaces of the optical element located on the optical-recording-medium side need not be arranged excessively close to the optical recording medium, whereby the above-mentioned working distance can be sufficiently ensured. In addition, a reflective element need not be arranged on the optical path.

According to the present invention, it is possible to reduce the optical path length of the entire optical system and promote miniaturization of apparatuses. It is also possible to realize reductions in the number of component parts and cost reductions by omitting a mirror for changing an optical path.

The above-mentioned optical elements can be reduced in the number of the component parts and the costs by adopting a construction in which a first optical device including a surface having negative power and a second optical device including a surface having positive power are combined with each other, or a construction which uses only one optical element constructed so that one surface has negative power and another surface has positive power. Accordingly, the optical elements are suited to miniaturization applications and high accuracy applications.

In the case where the hologram surface is formed as a composite surface on which a hologram pattern is formed on an aspherical surface, spherical aberration can be made small, whereby good optical characteristics can be obtained. In the case where the hologram surface is formed as a surface on which a hologram pattern is formed on a plane surface, the hologram having the desired diffraction action can be easily and highly accurately formed on a surface having no power.

In addition, since the hologram pattern is formed on the hologram surface in a region which determines the necessary numerical aperture, it is possible to control the numerical aperture without using an aperture.

BRIEF DESCRIPTION OF THE DRAWINGS

FIG. 5 is an illustration showing a front view of a hologram surface of an embodiment of the present invention.

DESCRIPTION OF THE EMBODIMENT

Figure 1:
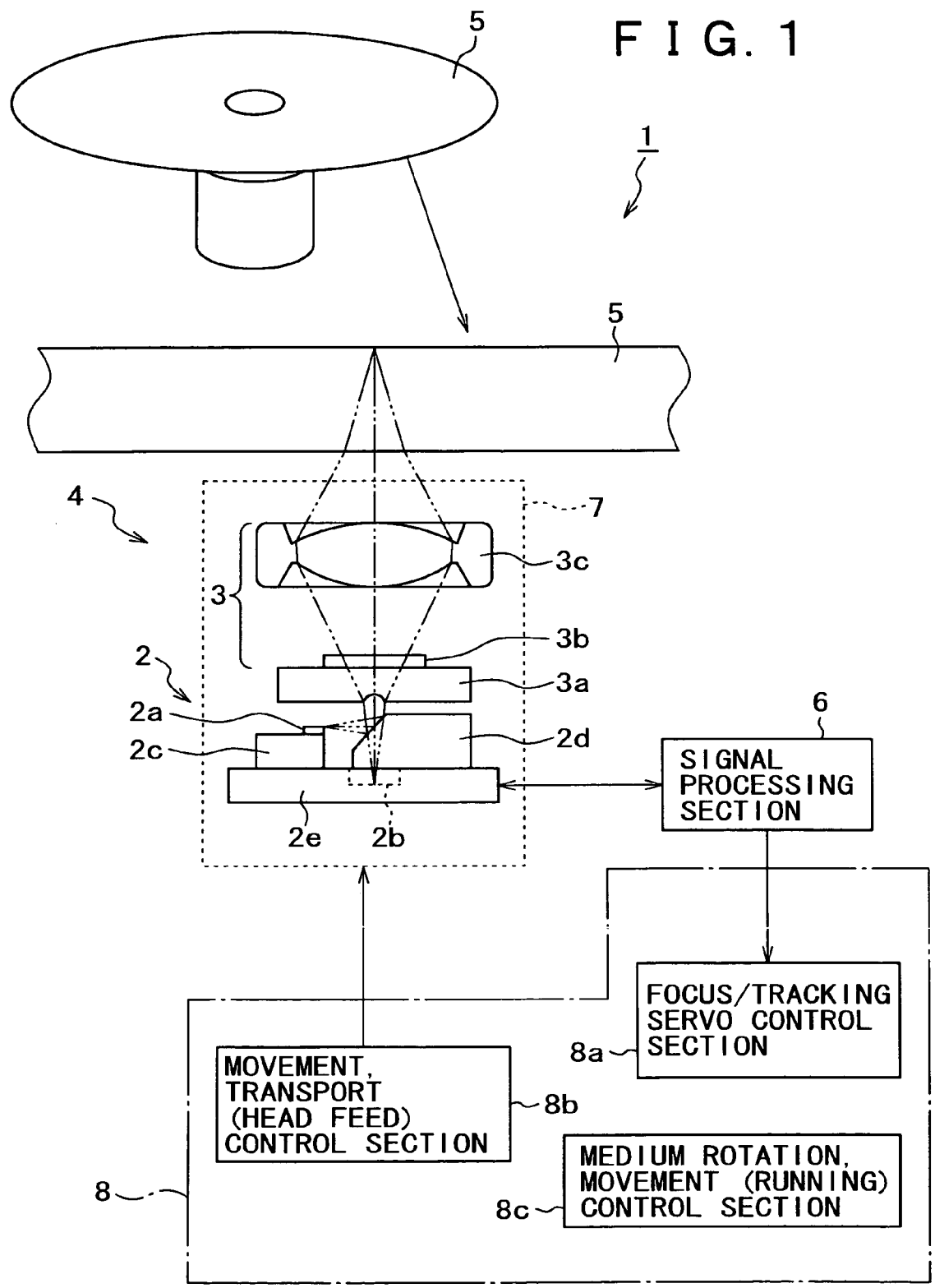
FIG. 1 is an illustration showing a basic construction example according to the present invention.

FIG. 1 shows a basic construction example according to the present invention, and an optical information processing apparatus 1 is provided with an optical system 4 which includes a light source 2 and a translucent optical element 3.

The light source 2 is a coherent light source, and in this example, an optical integrated device is used in which a light-emitting element 2a such as a laser diode and a light-receiving element 2b using a photodiode or the like are combined. Namely, a submount 2c on which a laser chip constituting the light-emitting element 2a is mounted and a prism member 2d are disposed on a substrate (mount) 2e, and a photodetector constituting the light-receiving element 2b is formed in the substrate 2e. It is to be noted that this example is not limitative and a construction in which the light-emitting element 2a and the light-receiving element 2b are respectively made of separate elements (a so-called discrete construction) is also available.

The optical element 3 is constructed using one or a plurality of optical devices, and does not include a reflective element such as a mirror. In this example, a coupling lens 3a, a λ/4 plate (a ¼ wavelength plate) 3b, and an objective lens 3c are arranged on the optical axis of the optical system 4.

The output light of the light-emitting element 2a receives 90 degrees of optical-path change at a reflection surface (an inclined surface) formed on the prism member 2d. Then, scattered light emitted outwardly from the light source 2 is transmitted through and focused by the optical element 3, and is irradiated onto an optical recording medium 5 from the objective lens 3c. As the optical recording medium 5, for example, not only an optical disk, a magneto-optical disk, a phase-change disk and the like but also an optical card-like medium, a tape-like medium and the like can be enumerated.

Return light after having reflected at a recording layer of the optical recording medium 5 is transmitted through the objective lens 3c, and its polarization direction is rotated by 90 degrees in the λ/4 plate 3b. This aims to eliminate the influence of the return light on laser, and realizes a construction resistant to return-light noise. Light transmitted through the coupling lens 3a is then transmitted through the prism member 2d and reaches the light-receiving element 2b, and the necessary information is detected in the light-receiving element 2b and is sent to a signal processing section 6.

In this manner, the optical system 4 including the light source 2 and the optical element 3 constitutes an optical head apparatus 7, and is used for reproduction or recording (including rewriting and erasure) of information from or on the optical recording medium 5.

The signal processing section 6 extracts an RF (Radio Frequency) signal and a servo error signal on the basis of the received signal, and transmits the latter to a servo control section 8. The servo control section 8 includes, for example, the following control sections.

a control section (8a) responsible for focus servo and tracking servo for driving the objective lens 3c by using an actuator (not shown) in response to the servo error signal;

a control section (8b) which drives and controls a linear movement mechanism such as a ball screw and a rotation mechanism such as a swing arm for the purpose of performing movement and transport of the optical head apparatus 7 (head feed) with respect to the optical recording medium 5; and a control section (8c) responsible for rotation, movement, running and the like of the optical recording medium 5.

The construction of the optical system 4 will be described below.

In the above-mentioned optical element 3, since the previously-mentioned problem occurs if the radii of curvature of its constituent surfaces become excessively small, it is desirable to form a hologram pattern (a diffraction grating pattern) on a lens surface or a plane surface of a spherical or aspherical lens or a gradient index lens so that larger power (including refractive power and diffractive power) can be obtained with the radii of curvature maintained at a certain extent of magnitude, and to use its diffractive action. Namely, the optical element 3 basically has a surface or surfaces having negative power on a light-source side, and a surface or surfaces having positive power on an optical-recording-medium side. At least one of these surfaces is formed as a transmissive hologram surface, and a concentric hologram pattern centered at the intersection of that surface and the optical axis of the optical system 4 is formed. Accordingly, it is possible to reduce the optical path length of the entire optical system, and it is also possible to reduce the area of the optical head apparatus 7 as viewed from the direction of the optical axis.

As forms of constructions, for example, the following examples can be enumerated.

(I) A form which is constructed using a first optical device including a surface having negative power and a second optical device including a surface having positive power.

(II) A form which is constructed by one optical device including a surface having negative power and a surface having positive power.

In the form (I), for example, a lens having negative power is disposed on a side closer to the light source, and a lens having positive power is disposed on a side closer to the optical recording medium, and a construction example in which a hologram pattern is formed on one or both surfaces of the lens having positive power can be enumerated. Namely, large positive power can be obtained by adding a diffraction action due to the hologram pattern to the refraction action of a lens surface.

As the form (II), an example can be enumerated in which, for example, a lens surface or a hologram surface having negative power or a composite surface of these lens and hologram surfaces is formed on a side closer to the light source, and a lens surface or a hologram surface having positive power or a composite surface of these lens and hologram surfaces is formed on a side closer to the optical recording medium.

It is to be noted that each form is suited to miniaturization and reductions in the number of component parts and costs because the optical system can be constructed using a small number of optical devices. In the case where the concentric hologram pattern is formed on the lens surface or the plane surface to give a diffraction action thereto, semiconductor fabrication processing techniques (lithography and the like) can be used to obtain the necessary accuracy.

One example of optical specifications in applications to optical disks or the like can be enumerated as follows:

| Laser Wavelength | 780 nm |
| --- | --- |
| Numerical Aperture | 0.45 |
| O/I Distance | 5.3 mm |
| Working Distance | 1 mm |
| Optical Magnification | 4 times. |

Embodiment 1

Figure 2:
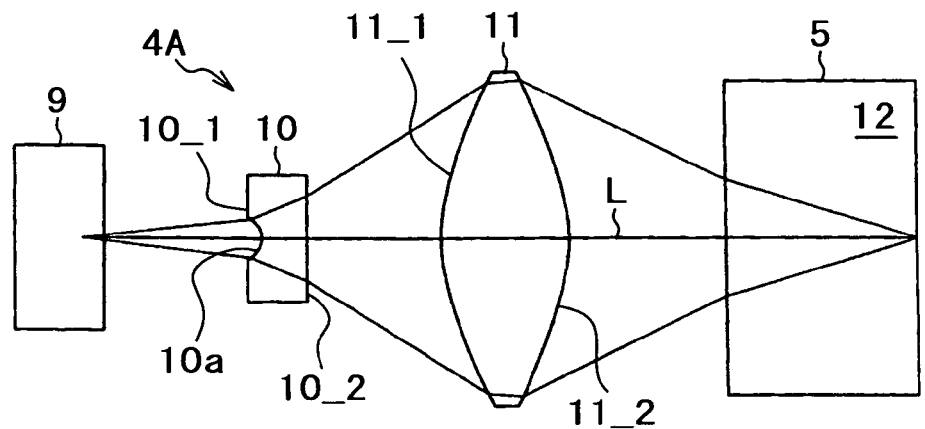
FIG. 2 is a diagram showing construction example of an embodiment 1.

FIG. 2 shows the essential portion of an optical system associated with the above-mentioned form (I), and in FIG. 2, "L" denotes its optical axis.

In an optical system 4A shown in this embodiment, a composite element (a so-called laser coupler) of a laser diode and a photodetector is used as a light-emitting/receiving element (or a light-transmitting/receiving element) 9, and light exiting from the composite element, after having been transmitted through a coupling lens 10, is irradiated onto an optical disk 12 (part of which is shown in FIG. 2) via an objective lens 11.

The coupling lens 10 disposed near the light-emitting/receiving element 9 has negative power as a whole. In this embodiment, a concave surface 10a is formed on a first surface 10_1 opposed to the light-emitting/receiving element 9, and a second surface 10_2 on the side of an optical disk 12 is formed as a plane surface. Incidentally, the concave surface 10a is formed as an aspherical surface having negative curvature.

The objective lens 11 disposed near the optical disk 12 has positive power as a whole. In this embodiment, a first surface 11_1 on the side of the light-emitting/receiving element 9 is formed as an aspherical surface of positive curvature, and a second surface 11_2 opposed to the optical disk 12 is formed as a composite surface in which a hologram pattern is formed on an aspherical surface of positive curvature. Namely, the hologram is formed on the lens surface in a composite form and condensing power due to its diffraction action is added to the lens surface, whereby the central thickness of the objective lens can be made small and the optical path length of the entire system (the length between the light-emitting/receiving element 9 and the optical disk 12) can be made short.

Since the hologram surface (the second surface 11_2) is formed as the composite surface in which the hologram pattern is formed on the aspherical surface, this embodiment is effective in reducing spherical aberration. In addition, regarding the hologram surface, since the hologram pattern is formed in a region which determines the necessary numerical aperture, an aperture to be used for controlling the numerical aperture is not necessary. Namely, the numerical aperture can be controlled by limiting the formation area of the hologram pattern to a region within the necessary diameter, whereby it is possible to effectively achieve suppression of variations in numerical aperture and a reduction in the number of component parts.

Light exiting from the light-emitting/receiving element 9 is refracted in directions away from an optical axis L at the concave surface 10a of the coupling lens 10, and is then condensed by the objective lens 11 and irradiated onto the optical disk 12. It is to be noted that the surface separation accuracy and the decentration accuracy (the deviation in a plane orthogonal to the optical axis) between the coupling lens 10 and the objective lens 11 can be held within an allowable range by realizing, for example, a construction in which a surface for receiving the periphery of the objective lens 11 is formed on a flange portion of the coupling lens 10 and both lenses are mechanically combined (a so-called "doublet"). In addition, to reduce the noise of return light to laser, it is preferable to arrange a ¼ wavelength plate on the side of the second surface 10_2 of the coupling lens 10, and light which has been transmitted through the wavelength plate and further the coupling lens 10 is detected by a photodetector in the light-emitting/receiving element 9, whereby an RF signal and a servo error signal are obtained.

It is to be noted that if a construction in which the coupling lens 10 is bonded to the light-emitting/receiving element 9 is adopted, the optical system 4A can be made far more compact and a positional deviation between a laser emission point and a lens does not occur during focus control or tracking control, whereby servo control free of characteristic degradation can be realized. In addition, in a form of construction in which the coupling lens 10 and the objective lens 11 are integrated, a method of driving the optical system including both lenses and a method of moving the light-emitting/receiving element 9 with respect to the optical system can be enumerated for focus servo control and tracking servo control.

Embodiment 2

Figure 3:
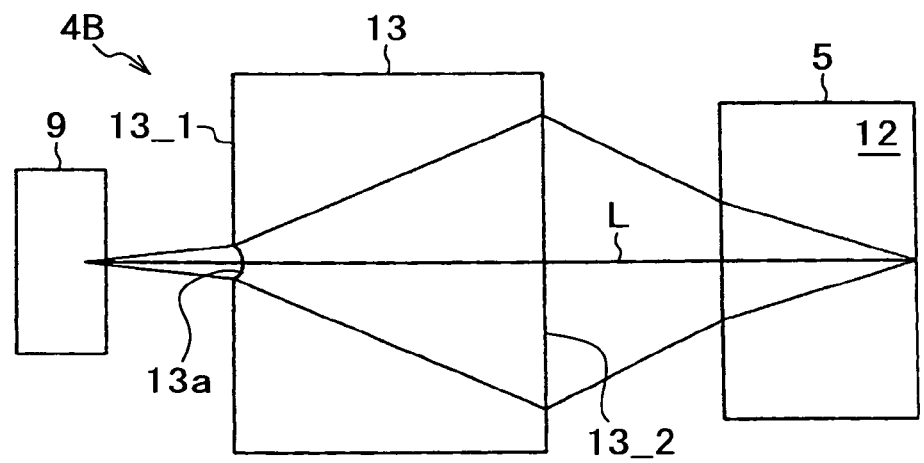
FIG. 3 is a diagram showing construction example of an embodiment 2.

FIG. 3 shows the essential portion of an optical system associated with the above-mentioned form (II), and "L" denotes its optical axis.

In an optical system 4B shown in this embodiment, the light-emitting/receiving element 9 which is the same as that of Embodiment 1 is used, and light exiting therefrom, after having been transmitted through a hologram element 13, is irradiated onto the optical disk 12.

In the hologram element 13, a first surface 13_1 opposed to the light-emitting/receiving element 9 has negative power, and a concave surface 13a is formed as an aspherical surface of negative curvature. A second surface 13_2 opposed to the optical disk 12 is formed as a hologram surface having positive power. Namely, in this embodiment, positive power is obtained only from the surface on which the hologram pattern is formed on a plane surface, whereby the optical path length of the entire system can be made short.

Since the first surface having negative power and the second surface having positive power are formed on one hologram element, it is possible to increase the decentration accuracy and the surface separation accuracy between the surfaces, whereby good characteristics and quality can be obtained and a single optical device suffices. In addition, regarding the hologram surface (the second surface 13_2), since the hologram pattern is formed in a region which determines the necessary numerical aperture, an aperture to be used for controlling the numerical aperture is not necessary.

Embodiment 3

Figure 4:
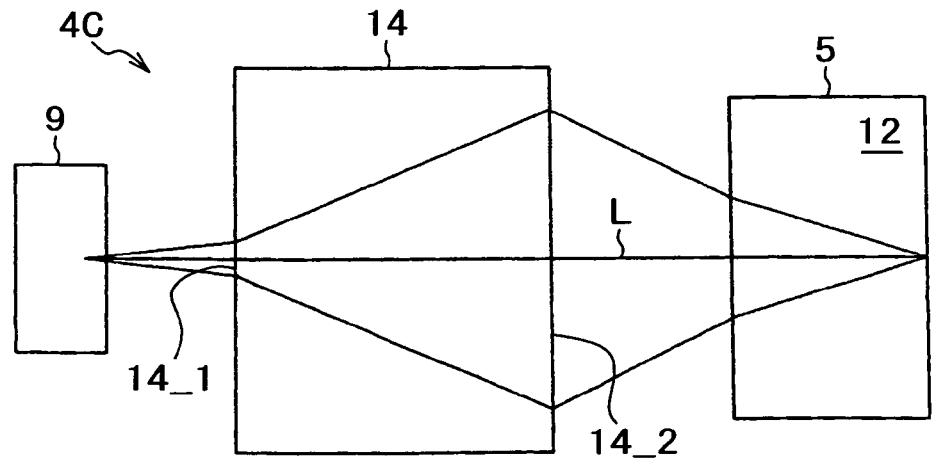
FIG. 4 is a diagram showing construction example of an embodiment 3.

FIG. 4 shows the essential portion of an optical system associated with the above-mentioned form (II), and in FIG. 4, "L" denotes its optical axis.

An optical system 4C shown in this embodiment differs from the optical system 4B shown in Embodiment 2 in that both the first and second surfaces of its hologram element are formed as hologram surfaces.

Namely, light exiting from the light-emitting/receiving element 9 is irradiated onto the optical disk 12 after having been transmitted through a hologram element 14, and in the hologram element 14, a first surface 14_1 opposed to the light-emitting/receiving element 9 is formed as a hologram surface having negative power, and a second surface 14_2 opposed to the optical disk 12 is formed as a hologram surface having positive power.

In this embodiment as well, it is advantageous in terms of accuracy and the number of component parts that the first surface having negative power and the second surface having positive power are formed on one hologram element. In addition, since the hologram pattern is formed in a region which determines the necessary numerical aperture, an aperture to be used for controlling the numerical aperture is not necessary.

It is to be noted that each of the hologram surfaces shown in Embodiment 3 as well as Embodiment 2 mentioned above is formed as a surface on which a hologram pattern is formed on a plane surface, whereby easy processing and high accuracy can be obtained compared to a case where a hologram pattern is formed on a spherical or aspherical surface.

According to each of the above-mentioned constructions, it is possible to obtain advantages to be described later by way of example.

Since a mirror to be arranged on the optical path is eliminated, it is possible to reduce the number of component parts and it is also possible to ensure cost reductions and the assembly accuracy of component parts.

An optical arrangement which can minimize the bending of the optical path due to a mirror or the like is adopted, whereby the area of the optical head apparatus can be made small as viewed from the optical-axis direction of the optical system and the miniaturization of the apparatus can be realized.

It is possible to realize a reduction in the weight of the entire optical block including a frame, a chassis and the like, and it is also possible to increase the reliability of a servo system responsible for the entire optical system including the light-emitting/receiving element (for example, the influence of aberration degradation during tracking servo and the influences of laser noise, aberration degradation and the like due to variations in input/output optical path length (I/O length) can be reduced to realize improvements in characteristics and stabilization.

Since the formation range of the hologram pattern is limited in the necessary diameter on the hologram surface, the numerical aperture can be freely controlled in design (it is not necessary to prepare an aperture, whereby variations of numerical apertures can be reduced and the costs of component parts can be reduced).

FIG. 5 shows a front view of hologram surface 11_2. A concentric hologram pattern is shown centered at an intersection of hologram surface 11_2 and the optical axis of the optical system 4.

Finally, the embodiments described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. An optical head apparatus having an optical system an including a light source and a translucent optical element and performing reproducing or recording of information by irradiating light exiting from said light source, after having been transmitted through said optical element, onto said optical recoding medium, wherein said optical element comprises a surface or surfaces having negative power on said light-source side, and a surface or surfaces having positive power on an optical-recording-medium side, one or more of these surfaces is formed as a hologram surface in order to increase said negative or positive power, and a concentric hologram pattern centered at an intersection of said surface and an optical axis of said optical system is formed.

2. The optical head apparatus according to claim 1, wherein said optical element is formed by using a first optical device including a surface having negative power and a second optical device including a surface having positive power, or by using one optical device including one surface having negative power and another surface having positive power.

3. The optical head apparatus according to claim 1, wherein said hologram surface is formed as a composite surface on which a hologram pattern is formed on an aspherical surface.

4. The optical head apparatus according to claim 1, wherein said hologram surface is formed such that a hologram pattern is formed on a plane surface.

5. The optical head apparatus according to claim 1, wherein a hologram pattern is formed on said hologram surface in a region which determines necessary numerical aperture.

6. An optical information processing apparatus having an optical system an including a light source and a translucent optical element and performing reproducing or recording of information by irradiating light exiting from said light source, after having been transmitted through said optical element, onto said optical recoding medium, wherein said optical element comprises a surface or surfaces having negative power on said light-source side, and a surface or surfaces having positive power on an optical-recording-medium side, one or more of these surfaces is formed as a hologram surface in order to increase said negative or positive power, and a concentric hologram pattern centered at an intersection of said surface and an optical axis of said optical system is formed.

7. The optical information processing apparatus according to claim 6, wherein said optical element is formed by using a first optical device including a surface having negative power and a second optical device including a surface having positive power, or by using one optical device including one surface having negative power and another surface having positive power.

8. The optical information processing apparatus according to claim 6,
wherein said hologram surface is formed as a composite surface on which a hologram pattern is formed on an aspherical surface.

9. The optical information processing apparatus according to claim 6,
wherein said hologram surface is formed such that a hologram pattern is formed on a plane surface.

10. An optical information processing apparatus according to claim 6,
wherein a hologram pattern is formed on said hologram surface in a region which determines necessary numerical aperture.

* * * * *